No. 764,226. PATENTED JULY 5, 1904.
G. R. COTTRELL.
COFFEE ROASTING APPARATUS.
APPLICATION FILED NOV. 17, 1902.
NO MODEL. 3 SHEETS—SHEET 3.
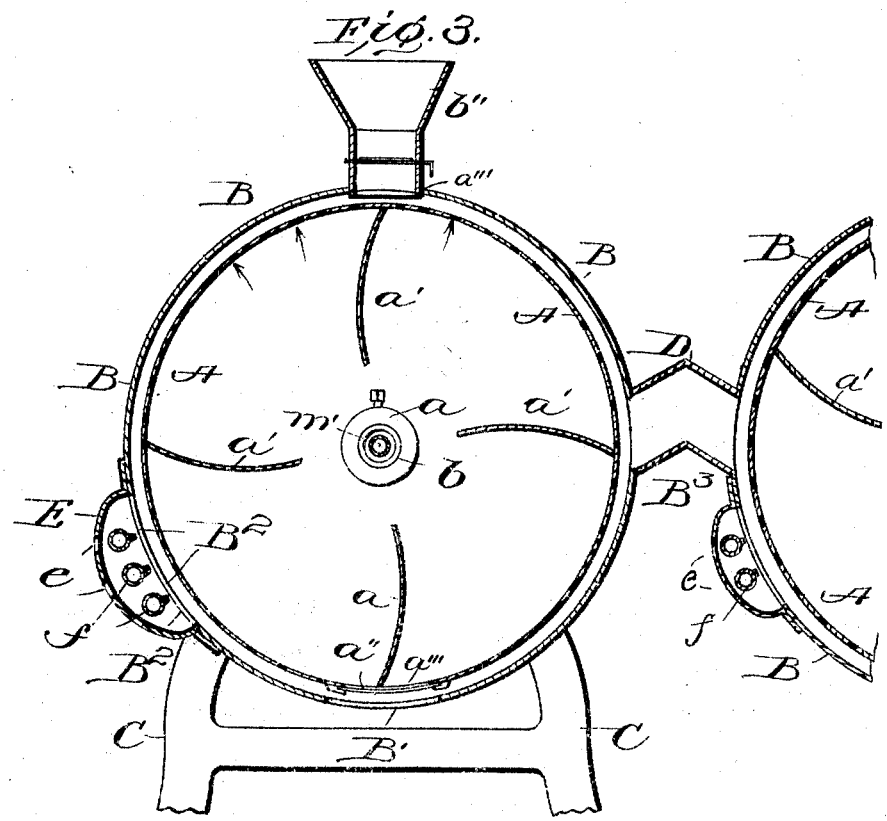
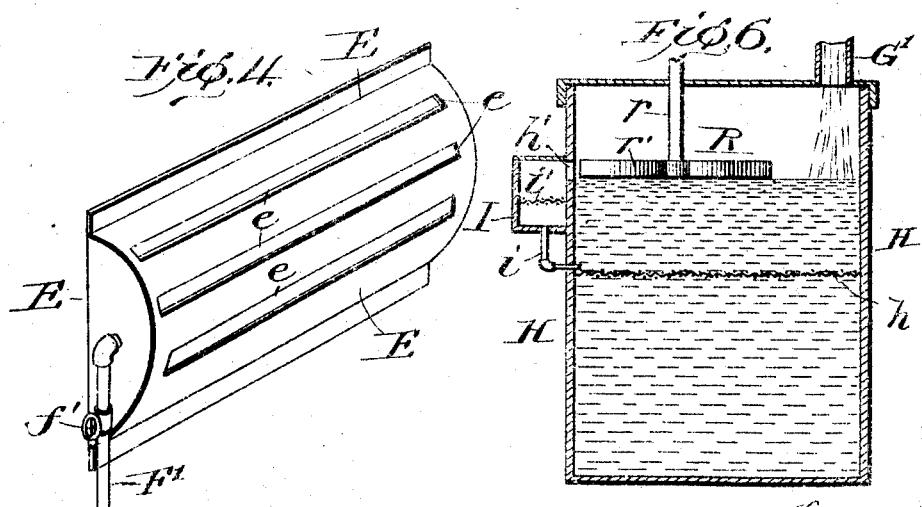
Witnesses
Inventor
George R. Cottrell
By E. B. Clark
Attorney No. 764,226. Patented July 5, 1904.

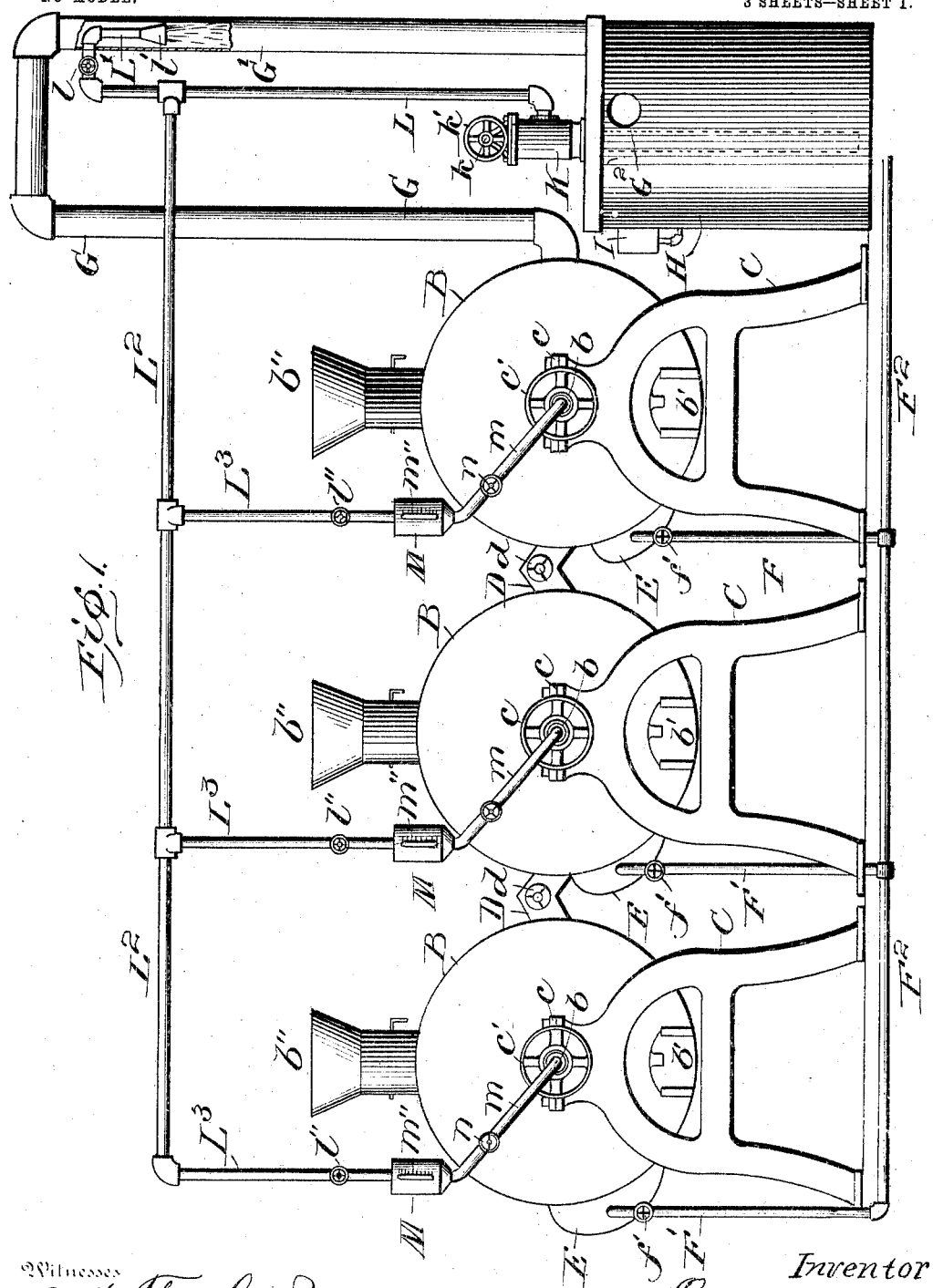

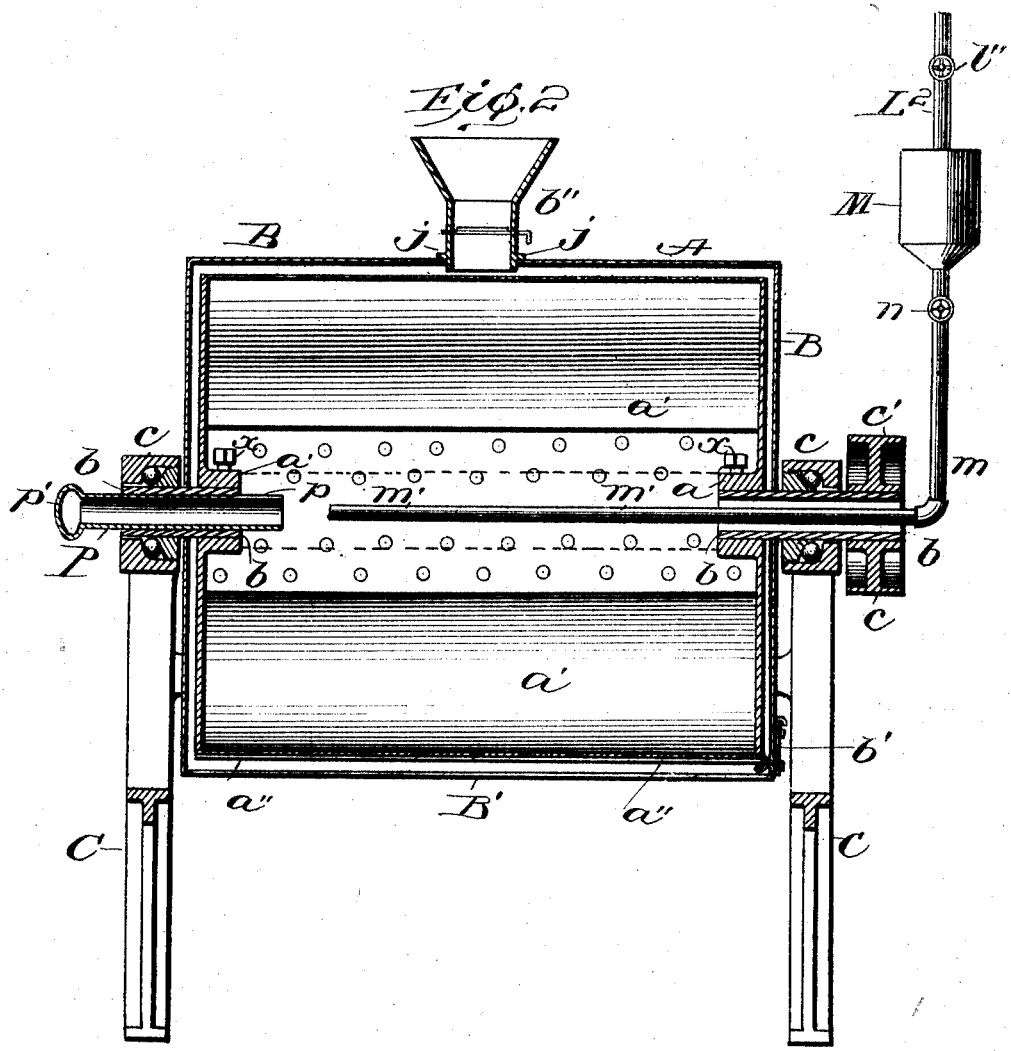
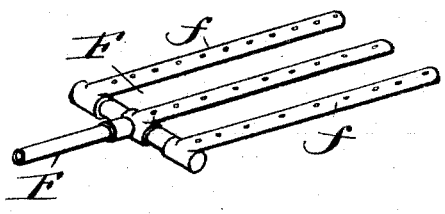

UNITED STATES PATENT OFFICE.

GEORGE R. COTTRELL, OF TOTTENVILLE, NEW YORK.

COFFEE-ROASTING APPARATUS.

SPECIFICATION forming part of Letters Patent No. 764,226, dated July 5, 1904.

Application filed November 17, 1902. Serial No. 131,716. (No model.)

*To all whom it may concern:*

Be it known that I, GEORGE R. COTTRELL, a citizen of the United States, residing at Tottenville, in the county of Richmond and State of New York, have invented certain new and useful Improvements in Coffee-Roasting Apparatus; and I do hereby declare the following to be a full, clear, and exact description of the invention, such as will enable others skilled in the art to which it appertains to make and use the same.

This invention relates to coffee-roasters, and particularly to an improved roaster which is adapted for rapidly and economically roasting coffee on a large commercial scale.

The object of my invention is to provide for roasting coffee by means of hot air and the highly-heated aromatic gaseous products given off from one or more of the batches or charges of coffee being roasted, thereby utilizing the heat and hot products emanating from the charge in one roasting-cylinder for roasting a separate charge of coffee in a successive roasting-cylinder of a series. My revolving roasters and the inclosing jackets are connected together in series by longitudinal lateral passages extending the whole length of the cylinder for conducting the hot air and aromatic gaseous products from one to the other, and each revolving cylinder is provided with interior longitudinal blades or wings extending inward from the perforated wall toward the center (but leaving a wide central space) to act as fans for drawing forward the hot air and gases or vapors through the successive batches of coffee under treatment. These wings also serve for lifting the coffee as the cylinder is revolved, carrying the same upward and causing it to fall down in a shower through the passing currents of hot air and products, so that it shall be uniformly heated and roasted.

Another object of my invention is to provide for drawing off the vapors and gaseous products through the whole series of roasters and by means of a falling column of water absorbing and condensing the vapors containing the aroma, caffein, and essential oils which are extracted in the roasting process, then collecting the liquid impregnated with such valuable principles of the coffee, and finally returning such liquid to any one of the batches of coffee which has been roasted. The aroma and essential oils are thus preserved and returned to the coffee for increasing its flavor and strength.

Another object of my invention is to provide for roasting coffee by burning a mixture of gas and air previously mixed in the exact and proper proportions for producing perfect combustion, and thereby preventing the escape of soot or lampblack and noxious products into the coffee. The mixture of burning gas and air also serves to highly heat other air which is drawn in and through the series of revolving cylinders for effecting the roasting operation.

Another object of my invention is to provide for removing the coffee-skins, particles of chaff, and foreign matter from the liquid containing the coffee essence, and collecting such foreign matter in a separate receptacle, so that the essence which is returned to the coffee shall be freed from contaminating matter which might injure the flavor.

The matter constituting my invention herein will be set forth in the claims.

I will now describe the details of construction and operation of my improved coffee-roasting apparatus by reference to the accompanying drawings, in which—

Figure 1 represents an end elevation of my connected series of roasting-cylinders and the exhaust apparatus partly in section. Fig. 2 represents a longitudinal vertical section of one of the roasting-cylinders. Fig. 3 represents a vertical transverse section of a roasting-cylinder and one of the connecting-passages for conducting hot air and gaseous products to an adjacent cylinder of a series. Fig. 4 represents a perspective view of a hot-air and burner-inclosing hood. Fig. 5 represents a perspective view of burner-pipes. Fig. 6 represents a vertical section of a tank for condensing the coffee essence and having a skimming device for removing skins or chaff.

The perforated roasting-cylinder A is mounted by its hollow central hubs $a$ upon the hollow journals or trunnions $b$, being secured in place by set-screws $x$, as shown in Fig. 2, and said cylinder is provided with the interior radial wings or blades $a'$, secured to its cylindrical wall and extending inward, so as to leave a large free central space, as shown in Figs. 2 and 3. These blades or wings serve as fans for drawing and forcing forward hot air and products through the cylinder and from one cylinder to another. Each of the cylinders A is provided with a longitudinal sliding section $a''$, covering a longitudinal opening $a'''$, which serves for admitting the charge of coffee and for discharging the same after being roasted. A cylindrical outer shell or casing B is mounted in the frame C for inclosing the roasting-cylinder and is provided at the end with an opening and a sliding gate $b'$, as shown in Figs. 1 and 2, for permitting the removal of the sliding section $a''$ of cylinder A. The casing B is also provided at the top with a feeding funnel or hopper $b''$, which in practice is made adjustable up and down, so that it may be lowered and inserted through the opening $a'''$ of cylinder A at the time of charging the latter with coffee. For this purpose the hopper $b''$ is provided with lateral lugs $j$, which may be turned into corresponding notches (not here shown) in the casing B. Any other suitable means may be provided for adjusting the feed-hopper up and down. The hollow journals $b$ pass through openings in the opposite ends of the casing B and are provided with ball-bearings $c$, as shown in Fig. 2. These ball-bearings permit very easy motion of the revolving journals and remove the necessity of using much lubricating-oil, which is liable to be burned and impart an offensive odor to the coffee. With a similar object in view I dispense with gear-wheels and apply to the hollow shaft $b$ a belt-pulley $c'$, to which in practice a belt is applied for turning the roasting-cylinder A. The ball-bearings $c$ are constructed in the usual and well-known manner. The casing B is provided with a lateral longitudinal opening $B^2$, which in practice is covered by the inclosing hood E for gas and air burner F. The hood E is provided with two or three longitudinal slots $e$, so arranged as to be directly opposite the longitudinal perforated gas-burner pipes $f$, as shown in Fig. 3. The burner F for burning my mixture of gas and air is suitably supported within the hood E and is provided with three perforated burner-pipes $f$. In practice these pipes $f$ may be provided with burner-nipples like an ordinary bat-wing burner. A main gas and air supply pipe $F^2$ connects by the branch pipes $F'$, having valves $f'$, with the burners F, as shown in Fig. 1.

In practice I use my gas and air mixing meter for making a mixture of gas and air in suitable proportions according to the richness of the gas used for producing perfect combustion and force such mixture of gas and air to my burners F. The air which is admitted through the slots $e$ is heated by passage around and in contact with the burner-pipes and the flames issuing therefrom, and such hot air and the hot gaseous products from the gas-flames are passed into and through the revolving cylinders for roasting the coffee therein. The casings B are also provided with lateral openings $B^3$, Fig. 3, with which are connected the longitudinal passages D, preferably extending from end to end of the casings, so that the hot air and gaseous products shall be evenly distributed throughout the entire length of the revolving roasting-cylinders. The blades or wings $a'$ of the roasting-cylinders materially assist in drawing into the cylinder the hot air and gaseous products and propelling them forward from one cylinder and casing to another in the series.

The vapor-exhaust pipe G connects at the side of the last casing B in the series of roasters, extends upward, and connects by a branch pipe with the downwardly-extending exhaust-pipe $G'$, which connects at its lower end with the liquid-tank H. A force-pump K, having a suction-pipe extending down to near the bottom of tank H, is mounted on top of the tank or in other convenient position and is provided with a liquid-discharge pipe L, having a downwardly-extending branch $L'$ within the exhaust-pipe $G'$. This branch $L'$ is provided with a closing-valve $l$ and at its end with a spray-nozzle or rose-head $l'$ for discharging a shower or column of liquid into the exhaust-pipe $G'$. This column of falling water serves as an exhauster to draw off the vapors and gases containing the aromatic essential oils and coffee extract and carry the same down into body of liquid in tank H. The vapors and essential oils are absorbed by the water forming an aromatic extract or coffee essence. By pumping the liquid in tank H over and over and discharging it through the spray-nozzle it becomes highly charged with the coffee essence and is afterward used for cooling a batch of roasted coffee, thereby returning much of the valuable and highly-flavored extract which has been driven off in the roasting process. The piston-rod of the pump K will connect above to a crank-shaft $k$, having secured to one end the belt-pulley $k'$, by means of which and a suitable belt from a power-shaft the pump is operated. A liquid-pipe $L^2$ connects with the pipe L and is provided with branch pipes $L^3$, each having a valve $l''$, which supplies liquid to the measuring vessels M. These vessels M are provided with gage-glasses $m''$, as shown in Fig. 1, for showing the amount of liquid which is admitted to any one of the roasting-cylinders. Each vessel M is provided with a discharge-pipe $m$, having a valve $n$, which pipe extends into one of the hollow journals $b$ and is there connected with a perforated discharge-pipe $m'$, as shown in Fig. 2.

The tank H is provided near its middle portion with a transverse perforated partition-plate $h$ and at one side with an outlet-opening $h'$. A receiving-chamber I for coffee-skins, chaff, or other foreign matter is secured to the side wall of tank H, so as to connect with the interior of such tank by the opening $h'$. A drain-pipe $i$ connects the bottom of chamber I with the tank. The chamber I may also have a wire-cloth strainer $i''$. A skimming device R, having curved blades $r'$, is secured to a vertical shaft $r$, which extends through the top of the tank and in practice is provided with a belt-wheel (not here shown) for turning it. The skimmer is arranged with the blades near the surface of the liquid in tank H and serves for skimming off the floating coffee-skins and discharging them through the opening $h'$ into the chamber I. The perforated plates $h$ in tank H prevent the skins and chaff from settling down into the body of liquid at the bottom of the tank, so that they shall not be pumped up to the rose-head $l'$ or admitted to the measuring vessels M. The tank H may also be provided with an outlet-pipe $G^2$ for the escape of uncondensed gases. As the occasion requires the coffee-skins will be removed from the chamber I. A sampling device or tester P, composed of a tube having an opening $p$ at its inner end and a handle $p'$ at its outer end, is inserted through one of the hollow journals $b$ of the roasting-cylinder for catching a sample of coffee as the cylinder is revolved. This sampling device can be readily withdrawn for inspecting the coffee at various stages of the roasting operation. If the device P is withdrawn from the hollow journals, the whole interior of the roasting-cylinder can be inspected for ascertaining the interior conditions. In practice a thermometer may be inserted through one of the hollow journals for indicating the temperature in the interior of the roasting-cylinder.

After the first roasting-cylinder the burner F will not require more than one or two perforated burner-pipes $f$ and will burn a much smaller supply of gas than the first burner in the series, for the reason that a large volume of hot air and gaseous products is passed from one cylinder and casing through the connecting-passage into the adjacent cylinder and casing throughout the series. In each of the connecting pipes or passages D is placed an air-register $d$ for admitting a current of air when required to lower the temperature in any one of the roasting-cylinders. The series of roasters may consist of three cylinders and casings, as shown in Fig. 1, or of a larger number thereof, as required.

The operation of roasting coffee may be conducted as follows: The cylinders having been charged with the proper quantity of green coffee, the power shaft and belts will be started into operation for revolving the cylinders and gas will be admitted to the burners F and ignited in the hoods E, applied to the different casings. A sufficient supply of water will be placed in the condensing-tank H and the force-pump K started into operation for discharging a column of water from the spray-nozzle $l'$ in the exhaust-pipe $G'$, thereby drawing off the gases and vapors carrying the aromatic oil and coffee essence. The radial blades or wings $a'$ of the cylinders A acting as fans will draw forward the hot air and gaseous products from one casing through the connecting-passage D to the adjacent casing, and thereby cause such hot air and products to circulate through each of the roasting-cylinders. At the same time the wings $a'$ will carry upward a portion of the coffee and deliver it downward in a shower through the cylinder, so as to subject it to the circulating hot air and gaseous products, thereby causing it to be rapidly and evenly roasted. When a batch of coffee in any one cylinder or when the batches of two or more cylinders have been properly roasted, the valve $l$ in the branch pipe $L'$ may be partially or wholly closed and the liquid containing the coffee essence in tank H discharged by the pump and connecting-pipes into measuring vessels M and then discharged through the pipe $m$ and perforated pipe $m'$ into the batches of coffee in one or more of the cylinders. This supply of liquid containing the coffee essence will serve to cool the roasted coffee and to return to it a large percentage of the aromatic flavoring essence which has been extracted therefrom in the roasting process.

By the use of my improved apparatus and method of operating the same economical results are obtained in the use of gas, thereby saving much of the expense which has heretofore been entailed in roasting coffee by machines now in use. I also obtain valuable and economical results by condensing the coffee essence in water and returning it to the roasted coffee, thereby increasing its strength and aromatic flavor.

Having described my invention, what I claim, and desire to secure by Letters Patent, is—

1. A series of coffee-roasters connected together by wide lateral passages for hot air and gaseous products, each roaster having a revolving cylinder provided with inwardly-projecting radial blades or wings for drawing hot air and gaseous products through such passages, and thence through the revolving roasters of the series for utilizing the heat and products from one batch in roasting a successive batch of coffee, substantially as described.

2. The combination with two or more revoluble roasting-cylinders and inclosing casings, of lateral longitudinal passages connecting said casings, air-heating hoods having longitudinal air-inlets and burner-pipes in the hoods, said hoods and burners being applied laterally to the casings and adjacent to said connecting-passages, whereby the roasters may be economically and effectively heated by hot air and hot gaseous products, substantially as described.

3. The combination with a coffee-roasting cylinder and an inclosing casing, of an exhaust-pipe, a water or liquid spraying device therein, a connecting liquid-tank, and a force-pump connecting with said tank and spraying device whereby the gases and vapors containing aromatic coffee essence may be drawn off from the roaster and absorbed by the liquid and the liquid may be pumped over and over from the tank into the exhaust-pipe for increasing its strength and flavor, substantially as described.

4. The combination with a coffee-roaster and an inclosing casing therefor, of an exhaust-pipe, a connecting-tank containing liquid, a water-spraying device in said exhaust-pipe for drawing off gases and vapors from the roaster, a force-pump and a pipe connecting with the same and extending into the coffee-roaster for discharging liquid containing coffee essence onto the roasted coffee, substantially as described.

5. The combination with a coffee-roaster and an inclosing casing, of an exhaust-pipe, a connecting water-tank, a force-pump, a measuring vessel and a discharge-pipe leading therefrom into the roaster, and a liquid-supply pipe connecting the pump with said measuring vessel, substantially as described.

6. The combination with a coffee-roaster and an exhaust-pipe and tank containing liquid, of a skimming device placed in said tank for removing the coffee-skins from the surface of the liquid and a receiving-chamber for such material connecting with the interior of the tank at the surface of the liquid, substantially as described.

7. The combination with a perforated coffee-roasting cylinder and the outer closed casing and means for heating the same, of a second perforated roasting-cylinder and closed casing, and a passage or pipe connecting the casings, one with the other, whereby the hot air and gaseous products may be passed from one roaster into and through the connected roaster for utilizing and economizing heat, substantially as described.

8. In apparatus for roasting coffee, the combination with two roasting-cylinders and casings, of a wide passage extending approximately from end to end of the cylinder connecting the casings together, means for heating one of the roasters and means for drawing hot air and gaseous products from one of them through the connected cylinder and casing for utilizing and economizing heat, substantially as described.

9. The combination with a coffee-roaster, of a liquid-tank for condensing coffee essence and an exhaust-pipe G, G' having a liquid spraying and exhausting device $l'$ at its upper end and connecting said roaster with said tank, substantially as described.

10. In apparatus for roasting coffee, the combination with a roasting-cylinder and casing, of an exhaust-pipe having a liquid spraying and exhaust device at its upper end, a tank connecting with the exhaust-pipe for collecting and saving the aroma and coffee essence and means for supplying liquid from said tank to said spraying and exhaust device, substantially as described.

In testimony whereof I affix my signature in presence of two witnesses.

GEORGE R. COTTRELL.

Witnesses:
E. B. CLARK,
C. J. WILKINSON.